United States Patent
Li et al.

(10) Patent No.: US 11,199,984 B2
(45) Date of Patent: Dec. 14, 2021

(54) DATA WRITING METHOD AND APPARATUS, AND ELECTRONIC DEVICE

(71) Applicant: Beijing Baidu Netcom Science and Technology Co., Ltd., Beijing (CN)

(72) Inventors: Haoyang Li, Beijing (CN); Yuan Ruan, Beijing (CN)

(73) Assignee: Kunlunxin Technology (Beijing) Company Limited, Beijing (CN)

( * ) Notice: Subject to any disclaimer, the term of this patent is extended or adjusted under 35 U.S.C. 154(b) by 0 days.

(21) Appl. No.: 16/907,461

(22) Filed: Jun. 22, 2020

(65) Prior Publication Data
US 2021/0200438 A1 Jul. 1, 2021

(30) Foreign Application Priority Data
Dec. 31, 2019 (CN) .......................... 201911420581.3

(51) Int. Cl.
 *G06F 3/06* (2006.01)
 *G06F 9/32* (2018.01)
(52) U.S. Cl.
 CPC ............ *G06F 3/064* (2013.01); *G06F 3/0608* (2013.01); *G06F 3/0619* (2013.01); *G06F 3/0659* (2013.01); *G06F 3/0673* (2013.01); *G06F 9/321* (2013.01)
(58) Field of Classification Search
 CPC ....... G06F 3/064; G06F 3/0673; G06F 3/0608
 See application file for complete search history.

(56) References Cited

U.S. PATENT DOCUMENTS

| 7,162,583 B2 | 1/2007 | Adl-Tabatabai et al. |
| 8,843,711 B1 | 9/2014 | Yadav et al. |
| 10,853,257 B1* | 12/2020 | Yu .......................... G06F 3/0631 |
| 2005/0144386 A1 | 6/2005 | Adl-Tabatabai et al. |
| 2012/0272123 A1* | 10/2012 | Yeh ..................... G06F 12/0246 |
| | | 714/773 |
| 2013/0027802 A1 | 1/2013 | Kim |

(Continued)

FOREIGN PATENT DOCUMENTS

| CN | 100538664 C | 9/2009 |
| CN | 104753626 A | 7/2015 |

(Continued)

OTHER PUBLICATIONS

Korean Office Action corresponding to Korean Patent Application No. 10-2020-0079057, dated Oct. 23, 2021 (5 pages).

(Continued)

*Primary Examiner* — Edward J Dudek, Jr.
(74) *Attorney, Agent, or Firm* — Maginot, Moore & Beck LLP (57) ABSTRACT

In the field of data reading and writing technologies, a data writing method is associated with a data writing apparatus and an electronic device. The data writing method includes: determining whether a start storage address of a first data block is aligned with a bus bit width of a storage; in response to that the start storage address of the first data block is not aligned with the bus bit width of the storage, determining whether a second data block which is a data block immediately before the first data block is compressed; in response to that the second data block is compressed, executing complete writing on a first beat of the first data block.

20 Claims, 6 Drawing Sheets determining whether a start storage address of a first data block is aligned with a bus bit width of a storage — S101 in response to that the start storage address of the first data block is not aligned with the bus bit width of the storage, determining whether a second data block is compressed — S102 in response to that the second data block is compressed, executing the complete writing on a first beat of the first data block — S103

(56) References Cited

U.S. PATENT DOCUMENTS

2014/0208062 A1    7/2014  Cohen
2017/0286220 A1*  10/2017  Gerhard ................. G06F 3/061
2018/0060235 A1*   3/2018  Yap ........................ G06F 12/04
2019/0235759 A1*   8/2019  Sen ........................ G06F 3/065

FOREIGN PATENT DOCUMENTS

| | | |
|---|---|---|
| CN | 105320460 A | 2/2016 |
| CN | 110018792 A | 7/2019 |
| EP | 3168735 A1 | 5/2017 |
| KR | 20120121740 A | 11/2012 |
| KR | 20140094467 A | 7/2014 |

OTHER PUBLICATIONS

English Translation of Korean Office Action corresponding to Korean Patent Application No. 10-2020-0079057, dated Oct. 23, 2021 (6 pages).

\* cited by examiner

DATA WRITING METHOD AND APPARATUS, AND ELECTRONIC DEVICE

CROSS-REFERENCE TO RELATED APPLICATIONS

This application claims priority under 35 U.S.C. § 119 to Chinese Patent Application No. 201911420581.3, filed on Dec. 31, 2019, the disclosure of which is incorporated herein by reference in its entirety.

TECHNICAL FIELD

The present application relates to the field of data read and write technology in the computer technologies, and in particular, to a data writing method and a data writing apparatus, and an electronic device.

BACKGROUND

Writing data into a storage is a common operation. For example, in a neural network, neural network calculation is often accomplished in a Neural Processing Unit (NPU), and after neural network calculation is executed, a calculation result needs to be written into an off-chip storage. However, at present, in the writing operation for writing data into the storage, the number of partial writing operations is too large, wherein partial writing refers to a case where the bit width of the data written is less than the bus bit width of the storage. Thus, it may be seen that, at present, the writing performance of writing data into the storage is poor.

SUMMARY

The present application provides a data writing method and a data writing apparatus, and an electronic device, thereby solving the problem that the writing performance of writing data into a storage is poor.

In a first aspect, the present application provides a data writing method, which includes: determining whether a start storage address of a first data block is aligned with a bus bit width of a storage; in response to that the start storage address of the first data block is not aligned with the bus bit width of the storage, determining whether a second data block which is a data block immediately before the first data block is compressed; and in response to that the second data block is compressed, executing complete writing on a first beat of the first data block, wherein the bit width of the complete writing is equal to the bus bit width of the storage.

By the above steps, the first beat of the first data block may be adjusted from a partial writing to the complete writing, so that the writing performance of writing data into the storage may be improved.

Optionally, after executing the complete writing on the first beat of the first data block, the method further includes: modifying a mask of the first beat of the first data block into a mask indicating the complete writing.

By modifying the mask of the first beat of the first data block into a mask indicating the complete writing, it may be determined that the first beat of the first data block is the complete writing according to the mask, which is convenient for the subsequent data reading and management.

Optionally, executing the complete writing on the first beat of the first data block in response to that the second data block is compressed includes: in response to that the second data block is compressed, determining whether there is a compression gain with respect to the second data block according to an original length of the second data block and a compressed length of the compressed second data block, and in response to that there is the compression gain with respect to the second data block, executing the complete writing on the first beat of the first data block.

Because it executes the complete writing on the first beat of the first data block only when there exists a compression gain, errors in writing operation can be avoided, and writing performance of the storage can be further improved.

Optionally, determining whether the second data block is compressed in response to that the start storage address of the first data block is not aligned with the bus bit width of the storage includes: in response to that the start storage address of the first data block is not aligned with the bus bit width of the storage, determining whether the storage address of the first data block and the storage address of the second data block are consecutive storage addresses, and in response to that the storage address of the first data block and the storage address of the second data block are the consecutive storage addresses, determining whether the second data block is compressed.

Because the subsequent corresponding operation is executed only when the storage address of the first data block and the storage address of the second data block are the consecutive storage addresses, it may be avoided that a writing error occurs due to the complete writing of the first data block executed according to the compression situation of the second data block in response to that the first data block and the second data block are not data blocks of the consecutive storage addresses.

Optionally, the method further includes: determining whether an end storage address of the first data block is aligned with the bus bit width of the storage; in response to that the end storage address of the first data block is not aligned with the bus bit width of the storage, determining whether the first data block is compressed; and in response to that the first data block is compressed, executing the complete writing on the last beat of the first data block.

Because complete writing is executed on the last beat of the first data block, writing performance of the storage may be further improved.

In a second aspect, the present application provides a data writing apparatus, which includes: a first determining module, configured for determining whether a start storage address of a first data block is aligned with a bus bit width of a storage; a second determining module, configured for determining whether a second data block which is a data block immediately before the first data block is compressed in response to that the start storage address of the first data block is not aligned with the bus bit width of the storage; and a first writing module, configured for executing complete writing on a first beat of the first data block in response to that the second data block is compressed, wherein the bit width of the complete writing is equal to the bus bit width of the storage.

Optionally, the apparatus further includes: a modifying module, configured for modifying a mask of the first beat of the first data block into a mask indicating the complete writing.

Optionally, the first writing module is configured for, in response to that the second data block is compressed, determining whether there is a compression gain with respect to the second data block according to the original length of the second data block and the compressed length of the compressed second data block, and in response to that there is the compression gain with respect to the second data block, executing complete writing on the first beat of the first data block.

Optionally, the second determining module is configured for, in response to that the start storage address of the first data block is not aligned with the bus bit width of the storage, determining whether the storage address of the first data block and the storage address of the second data block are consecutive storage addresses, and in response to that the storage address of the first data block and the storage address of the second data block are the consecutive storage addresses, determining whether the second data block is compressed.

Optionally, the apparatus further includes: a third determining module, configured for determining whether an end storage address of the first data block is aligned with the bus bit width of the storage; a fourth determining module, configured for determining whether the first data block is compressed in response to that the end storage address of the first data block is not aligned with the bus bit width of the storage; and a second writing module, configured for executing the complete writing on the last beat of the first data block in response to that the first data block is compressed.

In a third aspect, the present application provides an electronic device, which includes: at least one processor; and a storage, configured for being communicatively connected to the at least one processor, wherein an instruction that can be executed by the at least one processor is stored in the storage, the at least one processor is configured for executing the instruction to implement the data writing method according to the present application.

In a fourth aspect, the present application provides a non-volatile computer-readable storage medium storing therein a computer instruction, and the computer instruction is configured for enabling the computer to implement the data writing method according to the present application.

An embodiment of the present application has the following advantages or beneficial effects.

It determines whether a start storage address of a first data block is aligned with a bus bit width of a storage; in response to that the start storage address of the first data block is not aligned with the bus bit width of the storage, it determines whether a second data block which is a data block immediately before the first data block is compressed; in response to that the second data block is compressed, the complete writing is executed on a first beat of the first data block. Thus, the technical problem of poor writing performance of the storage may be overcome, thereby attaining the technical effect of improving the writing performance of writing data into the storage.

Other effects of the above optional implementation modes will be illustrated below in conjunction with specific embodiments.

BRIEF DESCRIPTION OF THE DRAWINGS

The drawings are provided for facilitating to understand the solutions of the present application, rather than limiting the present application.

DETAILED DESCRIPTION

Exemplary embodiments of the present application will be illustrated below in conjunction with the drawings, wherein various details of the embodiments of the present application are included for facilitating the understanding, which should be construed as exemplary only. Therefore, it should be understood by one of ordinary skills in the art that various variations and modifications may be made to the embodiments described herein, without departing from the scope and spirit of the present application. Similarly, for clarity and simplicity, description of well-known functions and structures will be omitted in the description below.

Figure 1:
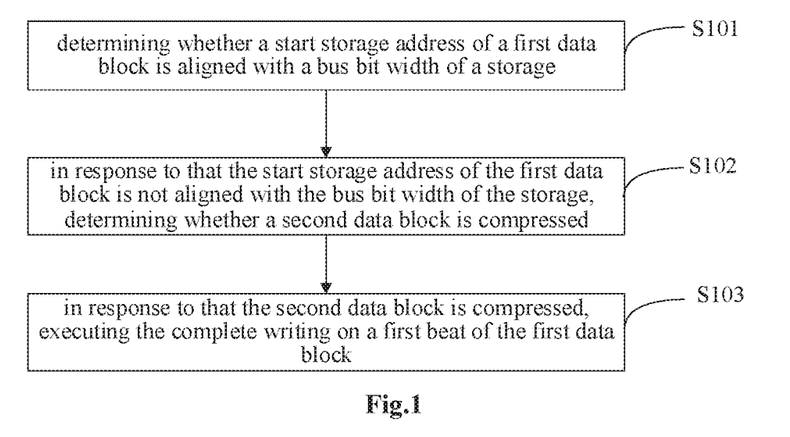
FIG. 1 is a flow chart of a data writing method according to the present application.

Referring to FIG. 1, it is a flow chart of a data writing method according to the present application, as shown in FIG. 1, the data writing method includes the steps below.

Step S101: determining whether a start storage address of a first data block is aligned with a bus bit width of a storage.

Figure 2:
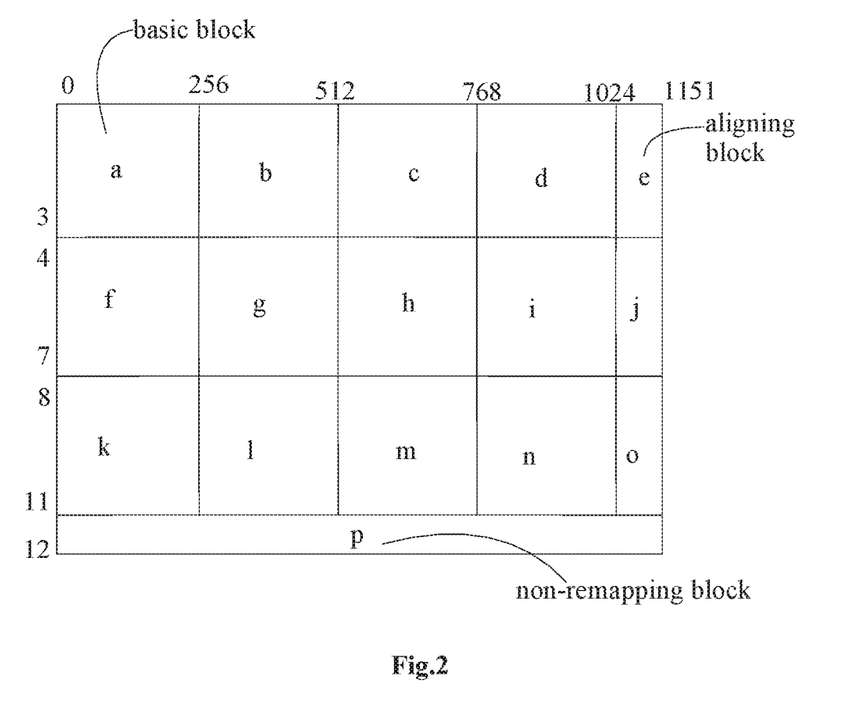
FIG. 2 is a segmented diagram of a data subblock according to the present application.

In the present application, a data block may be a data subblock for transporting data in a neural network, for example, data obtained after a completion of executing neural network calculation, which may be, e.g., a data subblock of data such as a weighting matrix or a feature map. Moreover, the data subblock may be a data subblock obtained by segmenting the above transported data. For example, as shown in FIG. 2, the transported data may be segmented into data subblocks such as basic blocks, aligning blocks and a non-remapping block, wherein the data size of each basic block is fixed, and the fixed size may be preconfigured, specifically, it may be configured as practically required; in addition, the aligning blocks and the non-remapping block are subblocks remained after the transported data block is segmented into a plurality of basic blocks, which cannot construct a basic block, and specifically, as shown in FIG. 2, the subblocks remained on the right are referred to as the aligning blocks, and the subblock remained at the bottom is referred to as the non-remapping block.

Further, the above first data block may be a basic block.

It should be noted that, in the present application, the data blocks are not limited to be data blocks in a neural network; instead, the data blocks may be other data blocks on which a writing operation needs to be executed.

Additionally, the above storage address may be the storage address of the data block in the storage.

Step S102: in response to that the start storage address of the first data block is not aligned with the bus bit width of the storage, determining whether a second data block is compressed, wherein the second data block is a data block immediately before the first data block.

It may determine whether the above second data block is compressed according to the length information of the second data block, or in response to that the second data block is being processed, if it is compressed, a tag may be set for the second data block to indicate that the second data block is compressed.

Further, in response to that the start storage address of the first data block is aligned with the bus bit width of the storage, the complete writing may be directly executed on the first beat of the first data block.

Additionally, in response to that it is determined that the second data block is not compressed, a partial writing may be executed on the first beat of the first data block.

Step S103: in response to that the second data block is compressed, executing the complete writing on a first beat of the first data block, wherein the bit width of the complete writing is equal to the bus bit width of the storage.

The above complete writing executed on the first beat of the first data block may be that the bit width of data written on the first beat of the first data block is equal to the bus bit width of the storage.

It should be noted that, the above method according to the present application may be applied to a chip (or, named a processor) configured for neural network calculation, e.g., a NPU or a hardware accelerator, and in such a case, the above storage may be an off-chip storage, that is, the above method is that the chip configured for the neural network calculation writes a first data block into an off-chip storage. However, the present application is not limited thereto, and it may also be applied to some electronic devices executing a data writing operation.

In this embodiment, in the above steps, because the start storage address of the first data block is not aligned with the bus bit width of the storage, the first beat of the first data block is originally a partial writing, but because the second data block is compressed, the complete writing will be executed on the first beat of the first data block, so that the first beat of the first data block may be adjusted from the partial writing to the complete writing, thereby improving the writing performance of writing data into the storage.

Figure 3:
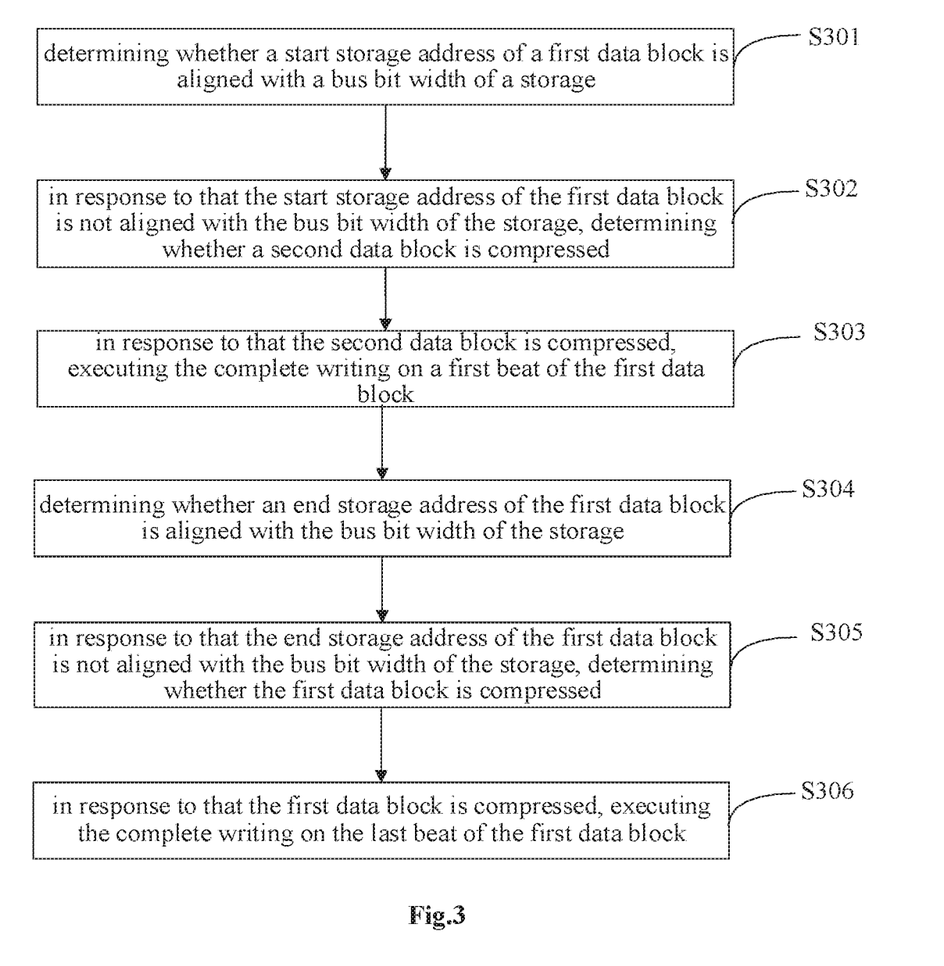
FIG. 3 is a flow chart of another data writing method according to the present application.

Referring to FIG. 3, it is a flow chart of another data writing method according to the present application, as shown in FIG. 3, the method includes the steps below.

Step S301: determining whether a start storage address of a first data block is aligned with a bus bit width of a storage.

Step S302: in response to that the start storage address of the first data block is not aligned with the bus bit width of the storage, determining whether a second data block is compressed, wherein the second data block is a data block immediately before the first data block.

The above step of determining whether a second data block is compressed in response to that the start storage address of the first data block is not aligned with the bus bit width of the storage may be as follow: in response to that the start storage address of the first data block is not aligned with the bus bit width of the storage, it determines whether the second data block is basic block, and in response to that the second data block is basic block, it determines whether a second data block is compressed. However, the present disclosure is not limited thereto, and it may determine directly.

Optionally, the step of determining whether the second data block is compressed in response to that the start storage address of the first data block is not aligned with the bus bit width of the storage includes: in response to that the start storage address of the first data block is not aligned with the bus bit width of the storage, it determines whether the storage address of the first data block and the storage address of the second data block are consecutive storage addresses, and in response to that the storage address of the first data block and the storage address of the second data block are the consecutive storage addresses, it determines whether a second data block is compressed.

Because the subsequent corresponding operation is executed only when the storage address of the first data block and the storage address of the second data block are the consecutive storage addresses, it may be avoided that a writing error occurs due to the complete writing of the first data block executed according to the compression situation of the second data block in response to that the first data block and the second data block are not data blocks of the consecutive storage addresses.

Step S303: in response to that the second data block is compressed, executing the complete writing on a first beat of the first data block, wherein the bit width of the complete writing is equal to the bus bit width of the storage.

Figure 4:
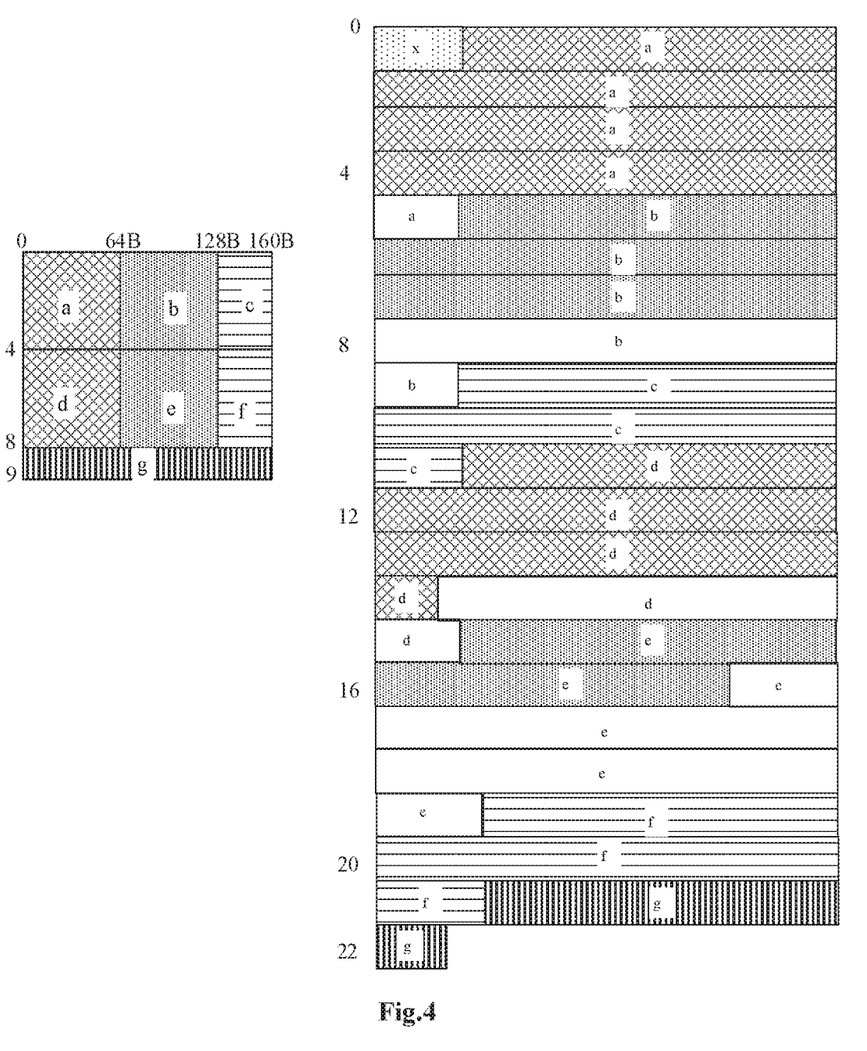
FIG. 4 is a schematic diagram of data writing according to the present application.

The above step of executing complete writing on a first beat of the first data block in response to that the second data block is compressed may be as follow: in response to that the second data block is compressed, it is determined that a front-segment storage address of a first-row storage address to which the start storage address of the first data block belongs is an invalid storage address (also referred to as invalid data part), so that data of the first data block may be written on the invalid storage address. The front-segment storage address herein originally is the storage address of the first data block, and the invalid storage address herein may be construed as the storage address no longer required after the second data block is compressed. For example, as shown in FIG. 4, the first data block is a data block b, and the second data block is a data block a, wherein the data block a is compressed, so that the white part on the $5^{th}$ row is an invalid storage address, and hence data of the data block b is written on this address.

Optionally, executing the complete writing on the first beat of the first data block in response to that the second data block is compressed includes: in response to that the second data block is compressed, it determines whether there is a compression gain with respect to the second data block according to the original length of the second data block and the compressed length of the compressed second data block, and in response to that there is the compression gain with respect to the second data block, executing the complete writing on a first beat of the first data block.

The original length of the second data block and the compressed length of the compressed second data block may be the length information recorded in response to that the second data block is being compressed.

Additionally, the above step of determining whether there is the compression gain with respect to the second data block according to the original length of the second data block and the compressed length of the compressed second data block may be as follow: it determines whether the compressed length of the compressed second data block is less than the original length of the second data block, and in response to that the compressed length of the compressed second data block is less than the original length of the second data block, it is determined that there is the compression gain with respect to the second data block; and in response to be otherwise, it is determined that the second data block has no compression gain. Alternately, the number of beats required for transmitting the second data block is determined according to the original length of the second data block, and the number of beats required for transmitting the data after the second data block is compressed is determined according to the compressed length of the compressed second data block. In response to that the number of beats required for transmitting the data after the second data block is compressed is less than the number of beats required for transmitting the second data block, it is determined that there is the compression gain with respect to the second data block; in response to be otherwise, it is determined that the second data block has no compression gain.

Thus, the problem that some data blocks has no compression gain although these data blocks are compressed may be avoided.

Further, in response to that the second data block has no compression gain, the partial writing may be executed on the first beat of the first data block.

Further, it may also determine whether the compression gain of the second data block is greater than the address region between the start storage address of the first data block and the bus bit width boundary of the storage according to the original length of the second data block and the compressed length of the compressed second data block, and in response to that the compression gain of the second data block is greater than the address region between the start storage address of the first data block and the bus bit width boundary of the storage, the complete writing is executed on the first beat of the first data block; and in response to be otherwise, the partial writing may be executed on the first beat of the first data block. Alternately, the determining step may not be performed, because in practical application, in response to that the compression gain exists, the compression gain is often greater than the address region between the start storage address and the bus bit width boundary of the storage.

In this embodiment, because the complete writing on the first beat of the first data block can be executed only when there exists the compression gain, errors in writing operation can be avoided, and writing performance of the storage can be further improved.

Optionally, after executing the complete writing on the first beat of the first data block, the method further includes: modifying a mask of the first beat of the first data block into a mask indicating the complete writing.

The above step of modifying a mask of the first beat of the first data block into the mask indicating the complete writing may be as follow: the masks of the first beat of the first data block are all modified into 1 to indicate the complete writing. However, the present disclosure is not limited hereto; for example, other values may be employed to indicate the complete writing.

By modifying the mask of the first beat of the first data block into the mask indicating the complete writing, it may be determined that the first beat of the first data block is the complete writing according to the mask, which is convenient for the subsequent data reading and management. Additionally, because only the related information of the data block immediately before the current data block is buffered each time, there is less information to be additionally stored and recorded; moreover, a logic for processing the data mask is simple, and there is less logic to be additionally added.

Optionally, as shown in FIG. 3, the above method may further include the steps below.

Step S304: determining whether an end storage address of the first data block is aligned with the bus bit width of the storage.

Step S305: in response to that the end storage address of the first data block is not aligned with the bus bit width of the storage, determining whether the first data block is compressed.

Step S306: in response to that the first data block is compressed, executing the complete writing on the last beat of the first data block.

The end storage address of the first data block may be the end address of the last beat of the first data block. Additionally, in the present application, after a writing operation of the first beat of the first data block is executed, it may continue to execute the writing of one or more intermediate beats, and each of the writings of these beats may be the complete writing.

The above step of executing the complete writing on the last beat of the first data block in response to that the first data block is compressed may be as follow: because the first data block is compressed, the storage address of the row to which the last beat belongs after the end storage address is the storage address that is no longer required after the first data block being compressed, and the overall data accuracy will not be affected by writing a random value at this storage address, thus the complete writing may be executed directly.

Additionally, in response to that the end storage address of the first data block is aligned with the bus bit width of the storage, the complete writing may be executed directly. In response to that the first data block is not compressed, the partial writing may be executed directly.

In this embodiment, because the complete writing is executed on the last beat of the first data block, the writing performance of the storage may be further improved.

Examples will be provided below, wherein the first data block and the second data block are basic blocks shown in FIG. 4.

For the basic block a, the first 16 Bytes (B) of the first beat are occupied by other data and thus cannot be optimized; the last beat is just aligned with the 64 bytes after the compression, thus no partial writing exists, and no optimization is required. For the basic block b, the first 16 bytes of the first beat are invalid data parts of the basic block a, and in response to that the basic block b is being processed, the basic block a has been processed, and it is known that the 16 bytes are invalid data parts. At this moment, the partial writing may be optimized, that is, the data of the basic block b are directly written into the storage according to the complete writing; and the last beat is just aligned with the 64 bytes after compression, thus no partial writing exists, and no optimization is required; For the aligning block c, the first 16 bytes of the first beat are invalid data parts of the basic block b, and in response to that the aligning block c is being processed, the basic block b has been processed, and it is known that the 16 bytes are invalid data parts. At this moment, the partial writing may be optimized, that is, the data of the aligning block c are directly written into the storage according to the complete writing; the last beat is not aligned, but the last 48 bytes are valid parts of the basic block d, which are not optimized. Optimization thereof is accomplished by a memory controller via a writing task combination together with the first beat of the basic block d. For basic block d, the first 16 bytes of the first beat are occupied by the aligning block c, which are not optimized.

Optimization thereof is accomplished by a memory controller via the writing task combination together with the last beat of the aligning block c; the last beat is not aligned, but the last several bytes are invalid data parts of the basic block d itself, and the partial writing may be optimized, that is, the data of the basic block d are directly written into the storage according to the complete writing. For basic block e, the front and rear non-aligned parts thereof are both invalid data appearing after compression, thus the partial writing optimization may be executed directly, and data may be written into the storage according to the complete writing. For aligning block f and non-remapping block g, similar processing is executed.

Thus it may be seen that, because data error will not be caused only when additional data are written on a storage location at which invalid data are stored after compression, a key step of this solution is to record and calculate whether the non-aligned part of each subblock is invalid data, and in response to that it is determined that the valid data will not be rewritten in response to that data are written at this location, the data mask part of the original write command is modified to expand the partial writing to the complete writing.

Figure 5:
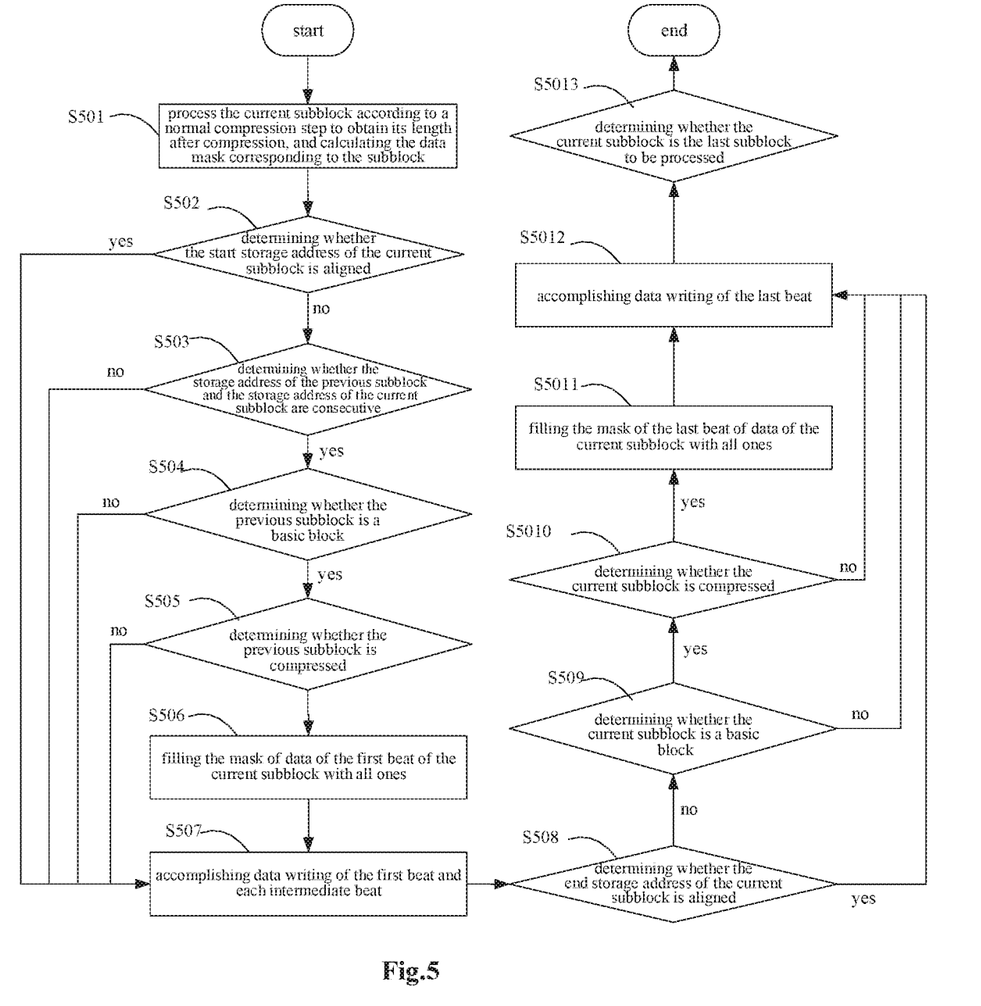
FIG. 5 is a flow chart of another data writing method according to the present application.

Referring to FIG. 5, it is a flow chart of another data writing method according to the present application. As shown in FIG. 5, the method includes the steps below.

Step S501: processing the current subblock (for example, the above first data block or the above basic block b) according to a normal compression step to obtain its length after compression, and calculating the data mask corresponding to the subblock. The step may be as follows: in response to that the subblock is a basic block, its length after compression is obtained simultaneously, and the data mask corresponding to the subblock is calculated.

Step S502: determining whether the start storage address of the current subblock is aligned, and in response to that the start storage address of the current subblock is aligned, executing Step S503; in response to be otherwise, executing Step S507.

Step S503: determining whether the storage address of the previous subblock (for example, the above second data block or the basic block a) and the storage address of the current subblock are consecutive, and in response to that the storage address of the previous subblock and the storage address of the current subblock are consecutive, executing Step S504; in response to be otherwise, executing Step S507.

Step S504: determining whether the previous subblock is a basic block, and in response to that the previous subblock is a basic block, executing Step S505; in response to be otherwise, executing Step S507.

Step S505: determining whether the previous subblock is compressed, and in response to that the previous subblock is compressed, executing Step S506; in response to be otherwise, executing Step S507; and specifically, this step may be: determining whether a compression gain exists.

Step S506: filling the mask of data of the first beat of the current subblock with all ones, that is, modifying the partial writing into the complete writing.

Step S507: accomplishing data writing of the first beat and each intermediate beat.

Step S508: determining whether the end storage address of the current subblock is aligned, and in response to that the end storage address of the current subblock is not aligned, executing Step S509; in response to be otherwise, executing Step S5013.

Step S509: determining whether the current subblock is a basic block, and in response to that the current subblock is the basic block, executing Step S5010; in response to be otherwise, executing Step S5013.

Step S5010: determining whether the current subblock is compressed, and in response to that the current subblock is compressed, executing Step S5011; in response to be otherwise, executing Step S5012; and specifically, this step may be: determining whether the compression gain exists.

Step S5011: filling the mask of the last beat of data of the current subblock with all ones, that is, modifying the partial writing into the complete writing.

Step S5012: accomplishing data writing of the last beat.

Step S5013: determining whether the current subblock is the last subblock to be processed, and in response to that the current subblock is the last subblock to be processed, the procedure ends; in response to be otherwise, starting to process the next subblock, and executing Step S501.

In this embodiment, the writing performance of the storage may be optimized.

Figure 6:
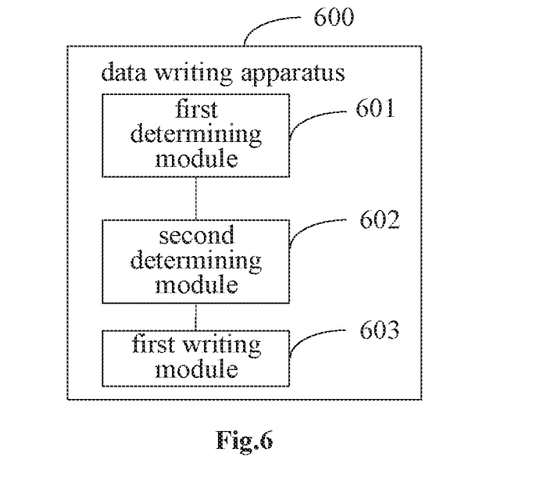
FIG. 6 is a structural diagram of a data writing apparatus according to the present application.

Referring to FIG. 6, it is a structural diagram of a data writing apparatus according to the present application. As shown in FIG. 6, the data writing apparatus 600 includes: a first determining module 601, configured for determining whether a start storage address of a first data block is aligned with a bus bit width of a storage; a second determining module 602, configured for determining whether a second data block is compressed in response to that the start storage address of the first data block is not aligned with the bus bit width of the storage, wherein the second data block is a data block immediately before the first data block; and a first writing module 603, configured for executing complete writing on a first beat of the first data block in response to that the second data block is compressed, wherein the bit width of the complete writing is equal to the bus bit width of the storage.

Figure 7:
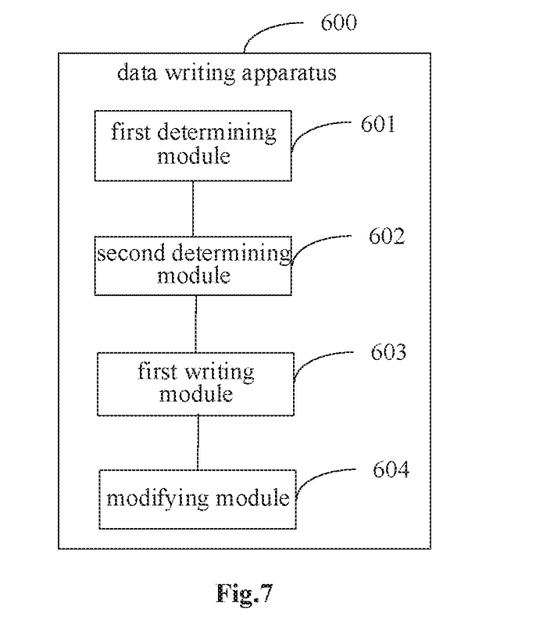
FIG. 7 is a structural diagram of a data writing apparatus according to the present application.

Optionally, as shown in FIG. 7, the apparatus further includes: a modifying module 604, configured for modifying a mask of the first beat of the first data block into a mask indicating the complete writing.

Optionally, the first writing module 603 is configured for, in response to that the second data block is compressed, determining whether there is a compression gain with respect to the second data block according to the original length of the second data block and the compressed length of the compressed second data block, and in response to that there is the compression gain with respect to the second data block, executing complete writing on the first beat of the first data block.

Optionally, the second determining module 602 is configured for, in response to that the start storage address of the first data block is not aligned with the bus bit width of the storage, determining whether the storage address of the first data block and the storage address of the second data block are consecutive storage addresses, and in response to that the storage address of the first data block and the storage address of the second data block are consecutive storage addresses, determining whether the second data block is compressed.

Figure 8:
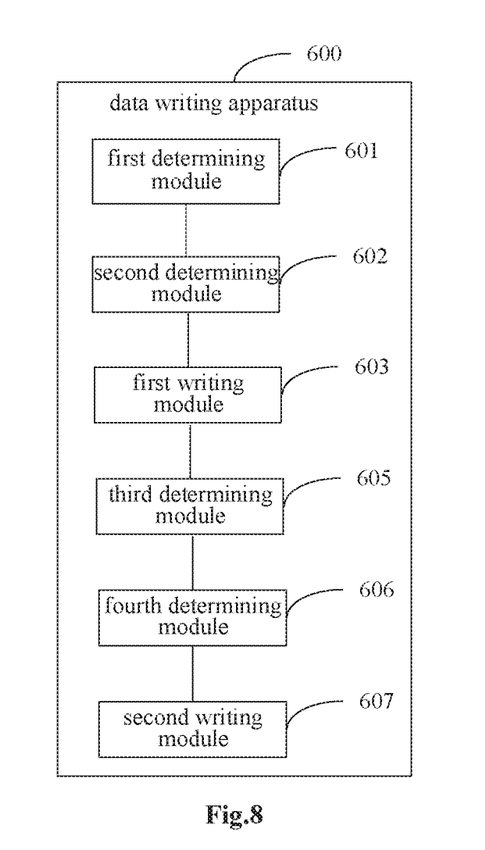
FIG. 8 is a structural diagram of a data writing apparatus according to the present application.

Optionally, as shown in FIG. 8, the apparatus further includes: a third determining module 605, configured for determining whether an end storage address of the first data block is aligned with the bus bit width of the storage; a fourth determining module 606, configured for determining whether the first data block is compressed in response to that the end storage address of the first data block is not aligned with the bus bit width of the storage; and a second writing module 607, configured for executing complete writing on the last beat of the first data block in response to that the first data block is compressed.

It should be noted that, the above apparatus may be a chip configured for neural network calculation, for example, a NPU or a hardware accelerator.

By the apparatus according to this embodiment, each process in the method embodiments shown in FIG. 1 and FIG. 3 can be implemented, and the same beneficial effects may be attained. In order to avoid repetition, no repeated description will be provided herein.

According to an embodiment, the present application further provides an electronic device and a readable storage medium.

Figure 9:
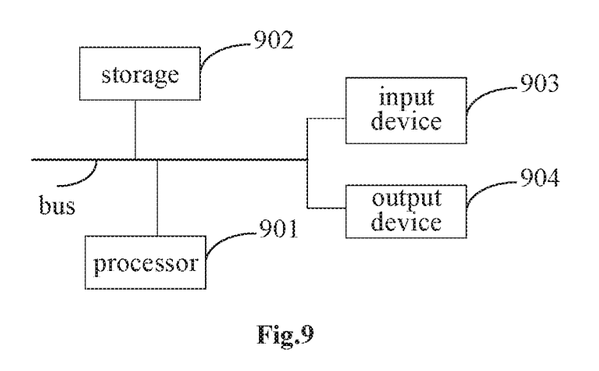
FIG. 9 is a block diagram of an electronic device for implementing the data writing method according to an embodiment of the present application.

As shown in FIG. 9, it is a block diagram of an electronic device for implementing the data writing method according to the embodiments of the present application. The electronic device is intended to represent various forms of digital computers, for example, a laptop computer, a desk-top computer, a workbench, a personal digital assistant, a server, a blade server, a large-scale computer and other suitable computers. The electronic device may also represent various forms of mobile apparatuses, for example, a personal digital assistant, a cellular telephone, an intelligent telephone, a wearable device and other similar computing apparatuses. The components, connections and relations therebetween, and functions thereof shown herein are exemplary only, rather than limiting implementation of the present application that is described and/or claimed herein.

As shown in FIG. 9, the electronic device includes: one or more processors 901, a storage 902, and interfaces for connecting each component, including high-speed interfaces and low-speed interfaces. Each component is connected with each other via different buses, and may be mounted on a common mainboard or may be mounted in other modes as required. The processor may process an instruction executed in the electronic device, including an instruction stored in or on a storage for displaying the graphical information of a Graphic User Interface (GUIP) on an external input/output device (for example, a display device coupled to the interface). In other embodiments, if required, a plurality of processors and/or a plurality of buses may be used together with a plurality of storages. Similarly, a plurality of electronic devices may be connected, wherein each device provides a part of the necessary operations (for example, as a server array, a group of blade servers, or a multiprocessor system). In FIG. 9, it shows an example in which one processor 901 is provided.

The storage 902 is a non-volatile computer-readable storage medium according to the present application. An instruction that may be executed by at least one processor is stored in the storage, and the instruction can enable the at least one processor to execute the data writing method according to the present application. A computer instruction is stored on the non-volatile computer-readable storage medium according to the present application, wherein the computer instruction is configured to enable the computer to execute the data writing method according to the present application.

As a non-volatile computer-readable storage medium, the storage 902 may be configured to store a non-volatile software program, a non-volatile computer executable program and module, for example, a program instruction/module (for example, the first determining module 601, the second determining module 602 and the first writing module 603 shown in FIG. 6) corresponding to the data writing method according to the embodiments of the present application. By running the non-volatile software program, instruction, and module stored in the storage 902, the processor 901 executes various functional applications and data processing of the server, i.e., implements the data writing method according to the above method embodiment.

The storage 902 may include a program storage area and a data storage area, wherein an operating system and an application program required by at least one function may be stored in the program storage area, and data created according to the use of an electronic device for implementing the data writing method may be stored in the data storage area. Additionally, the storage 902 may include a high-speed random access storage, or may include a non-volatile storage, for example, at least one of a disk storage, a flash memory or other non-volatile solid-state storage devices. In some embodiments, the storage 902 optionally includes a storage provided remotely relative to the processor 901, and the remote storage may be connected to an electronic device for implementing the data writing method via a network. Examples of the above network include, but are not limited to, Internet, Intranet, local area network, mobile communication network and a combination thereof.

The electronic device for implementing the data writing method may also include: an input device 903 and an output device 904. The processor 901, the storage 902, the input device 903 and the output device 904 may be connected via a bus or in other modes, and FIG. 9 provides an example in which they are connected via a bus.

The input device 903 may receive digital or character information that is input and generate a key signal input related to the user setting and functional control of the electronic device for implementing the data writing method. For example, the input device 903 may be an input device such as a touch screen, a keypad, a mouse, a trackpad, a touch pad, an indicating rod, one or more mouse buttons, a trackball and a joystick, etc. The output device 904 may include a display device, an auxiliary lighting apparatus (for example, a Light Emitting Diode (LED)) and a haptic feedback device (for example, a vibrating motor), etc. The display device may include, but not limited to, a Liquid Crystal Display (LCD), a LED display and a plasma display. In some embodiments, the display device may be a touch screen.

Various embodiments of the system and technology described here may be implemented in a digital electronic circuit system, an integrated circuit system, an Application Specific Integrated Circuit (ASIC), a computer hardware, firmware, software and/or a combination thereof. The various embodiments may include an implementation in one or more computer programs, the one or more computer program may be executed and/or explained in a programmable system including at least one programmable processor, the programmable processor may be a dedicated or general-purpose programmable processor, data and instructions may be received from a storage system, at least one input device and at least one output device and transmitted to the storage system, the at least one input device and the at least one output device.

The computation programs (also referred to as programs, software, software applications or codes) include machine instructions for a programmable processor, and may be implemented via advanced procedural programming language and/or object-oriented programming language, and/or assembly/machine language. As used herein, terms "machine-readable medium" and "computer-readable medium" refer to any computer program product, device and/or apparatus (for example, a magnetic disk, a compact disc, a storage and a Programmable Logic Device (PLD)) that is configured to provide machine instructions and/or data to a programmable processor, and include a machine-readable medium that receives a machine instruction as a machine-readable signal. The term "machine-readable signal" refers to any signal that is configured to provide a machine instruction and/or data to a programmable processor.

In order to provide user interaction, the system and technology described herein may be implemented on a computer, which includes: a display device (for example, a Cathode Ray Tube (CRT) or Liquid Crystal Display (LCD) monitor) configured to display information to a user; and a keyboard and a pointing device (for example, a mouse or a trackball), by which a user may provide an input to the computer. Other types of devices may also be configured to provide user interaction; for example, the feedback provided to a user may be a sensory feedback of any form (for example, a visual feedback, an auditory feedback or a tactile feedback); moreover, the input from the user may be received in any mode (including sound input, voice input or, tactile input).

The system and technology described herein may be implemented in a computing system including a background component (for example, a data server), or a computing system including a middleware component (for example, an application server), or a computing system including a front-end component (for example, a user computer with a graphic user interface or a network browser, by which a user may interact with the system and technology described here), or a computing system including any combination of the background component, the middleware component or the front-end component. The components of the system may be interconnected via digital data communication of any form or medium (for example, a communication network). Examples of the communication network include: Local Area Network (LAN), Wide Area Network (WAN) and Internet.

The computer system may include a client and a server. The client and the server are generally far away from each other and usually interact via a communication network. By running a computer program with a client-server relation on a corresponding computer, a client-server relation may be generated.

According to the technical solution of the embodiments of the present application, in the present application, because the first beat of the first data block is adjusted from the partial writing to the complete writing, writing performance of the storage may be improved.

It should be understood that, various forms of processes described above may be used with the steps thereof being rearranged, added or deleted. For example, each step recorded in the present application may be executed in parallel or sequentially, or in different orders, which is not limited so long as the expected result of the technical solution disclosed in the present application can be realized.

The above specific embodiments should not be construed as limiting the protection scope of the present application. It may be understood by one skilled in the art that, various modifications, combinations, subcombinations and substitutions may be made according to design requirements and other factors. All modifications, equivalent substitutions and improvements made without departing from the spirits and principles of the present application should pertain to the protection scope of the present application.

What is claimed is:

1. A data writing method, comprising:
   determining whether a start storage address of a first data block is aligned with a bus bit width of a storage;
   in response to that the start storage address of the first data block is not aligned with the bus bit width of the storage, determining whether a second data block which is a data block immediately before the first data block is compressed; and
   in response to that the second data block is compressed, executing complete writing on a first beat of the first data block, wherein a bit width of the complete writing is equal to the bus bit width of the storage.

2. The data writing method according to claim 1, wherein, after executing the complete writing on the first beat of the first data block, the method further comprises:
   modifying a mask of the first beat of the first data block into a mask indicating the complete writing.

3. The data writing method according to claim 1, wherein, executing the complete writing on the first beat of the first data block in response to that the second data block is compressed comprises:
   in response to that the second data block is compressed, determining whether there is a compression gain with respect to the second data block according to an original length of the second data block and a compressed length of the compressed second data block, and in response to that there is the compression gain with respect to the second data block, executing the complete writing on the first beat of the first data block.

4. The data writing method according to claim 1, wherein, determining whether the second data block is compressed in response to that the start storage address of the first data block is not aligned with the bus bit width of the storage comprises:
   in response to that the start storage address of the first data block is not aligned with the bus bit width of the storage, determining whether the storage address of the first data block and the storage address of the second data block are consecutive storage addresses, and in response to that the storage address of the first data block and the storage address of the second data block are the consecutive storage addresses, determining whether the second data block is compressed.

5. The data writing method according to claim 1, further comprising:
   determining whether an end storage address of the first data block is aligned with the bus bit width of the storage;
   in response to that the end storage address of the first data block is not aligned with the bus bit width of the storage, determining whether the first data block is compressed; and
   in response to that the first data block is compressed, executing the complete writing on a last beat of the first data block.

6. The data writing method according to claim 2, further comprising:
   determining whether an end storage address of the first data block is aligned with the bus bit width of the storage;
   in response to that the end storage address of the first data block is not aligned with the bus bit width of the storage, determining whether the first data block is compressed; and
   in response to that the first data block is compressed, executing the complete writing on a last beat of the first data block.

7. The data writing method according to claim 3, further comprising:
   determining whether an end storage address of the first data block is aligned with the bus bit width of the storage;

in response to that the end storage address of the first data block is not aligned with the bus bit width of the storage, determining whether the first data block is compressed; and in response to that the first data block is compressed, executing the complete writing on a last beat of the first data block.

8. An electronic device, comprising:
at least one processor; and
a storage configured to be communicatively connected to the at least one processor,
wherein an instruction configured to be executed by the at least one processor is stored in the storage, and the at least one processor is configured to execute the instruction to implement a data writing method, the data writing method including:
determining whether a start storage address of a first data block is aligned with a bus bit width of the storage,
in response to that the start storage address of the first data block is not aligned with the bus bit width of the storage, determining whether a second data block which is a data block immediately before the first data block is compressed, and
in response to that the second data block is compressed, executing complete writing on a first beat of the first data block, wherein a bit width of the complete writing is equal to the bus bit width of the storage.

9. The electronic device according to claim 8, wherein, the at least one processor is further configured to execute the instruction to:
modify a mask of the first beat of the first data block into a mask indicating the complete writing.

10. The electronic device according to claim 8, wherein, the at least one processor is further configured to execute the instruction to:
in response to that the second data block is compressed, determine whether there is a compression gain with respect to the second data block according to an original length of the second data block and a compressed length of the compressed second data block, and in response to that there is the compression gain with respect to the second data block, execute the complete writing on the first beat of the first data block.

11. The electronic device according to claim 8, wherein, the at least one processor is further configured to execute the instruction to:
in response to that the start storage address of the first data block is not aligned with the bus bit width of the storage, determine whether the storage address of the first data block and the storage address of the second data block are consecutive storage addresses, and in response to that the storage address of the first data block and the storage address of the second data block are the consecutive storage addresses, determine whether the second data block is compressed.

12. The electronic device according to claim 8, wherein, the at least one processor is further configured to execute the instruction to:
determine whether an end storage address of the first data block is aligned with the bus bit width of the storage;
in response to that the end storage address of the first data block is not aligned with the bus bit width of the storage, determine whether the first data block is compressed; and in response to that the first data block is compressed, execute the complete writing on a last beat of the first data block.

13. The electronic device according to claim 9, wherein, the at least one processor is further configured to execute the instruction to:
determine whether an end storage address of the first data block is aligned with the bus bit width of the storage;
in response to that the end storage address of the first data block is not aligned with the bus bit width of the storage, determine whether the first data block is compressed; and
in response to that the first data block is compressed, execute the complete writing on a last beat of the first data block.

14. The electronic device according to claim 10, wherein, the at least one processor is further configured to execute the instruction to:
determine whether an end storage address of the first data block is aligned with the bus bit width of the storage;
in response to that the end storage address of the first data block is not aligned with the bus bit width of the storage, determine whether the first data block is compressed; and
in response to that the first data block is compressed, execute the complete writing on a last beat of the first data block.

15. A non-volatile computer-readable storage medium storing therein a computer instruction, the computer instruction configured to enable a computer to implement a data writing method, the date writing method including:
determining whether a start storage address of a first data block is aligned with a bus bit width of a storage,
in response to that the start storage address of the first data block is not aligned with the bus bit width of the storage, determining whether a second data block which is a data block immediately before the first data block is compressed, and
in response to that the second data block is compressed, executing complete writing on a first beat of the first data block, wherein a bit width of the complete writing is equal to the bus bit width of the storage.

16. The non-volatile computer-readable storage medium according to claim 15, wherein the computer instruction is further configured to enable the computer to:
modify a mask of the first beat of the first data block into a mask indicating the complete writing.

17. The non-volatile computer-readable storage medium according to claim 15, wherein the computer instruction is further configured to enable the computer to:
in response to that the second data block is compressed, determine whether there is a compression gain with respect to the second data block according to an original length of the second data block and a compressed length of the compressed second data block, and in response to that there is the compression gain with respect to the second data block, execute the complete writing on the first beat of the first data block.

18. The non-volatile computer-readable storage medium according to claim 15, wherein the computer instruction is further configured to enable the computer to:
in response to that the start storage address of the first data block is not aligned with the bus bit width of the storage, determine whether the storage address of the first data block and the storage address of the second data block are consecutive storage addresses, and in response to that the storage address of the first data block and the storage address of the second data block are the consecutive storage addresses, determine whether the second data block is compressed.

19. The non-volatile computer-readable storage medium according to claim 15, wherein the computer instruction is further configured to enable the computer to:
   determine whether an end storage address of the first data block is aligned with the bus bit width of the storage;
   in response to that the end storage address of the first data block is not aligned with the bus bit width of the storage, determine whether the first data block is compressed; and
   in response to that the first data block is compressed, execute the complete writing on a last beat of the first data block.

20. The non-volatile computer-readable storage medium according to claim 16, wherein the computer instruction is further configured to enable the computer to:
   determine whether an end storage address of the first data block is aligned with the bus bit width of the storage;
   in response to that the end storage address of the first data block is not aligned with the bus bit width of the storage, determine whether the first data block is compressed; and
   in response to that the first data block is compressed, execute the complete writing on a last beat of the first data block.

* * * * *